US011755990B2

(12) United States Patent
Tarrant et al.

(10) Patent No.: US 11,755,990 B2
(45) Date of Patent: Sep. 12, 2023

(54) RFID TAG COMMISSIONING FOR OFFLINE TAG WRITING

(71) Applicant: SENSORMATIC ELECTRONICS, LLC, Boca Raton, FL (US)

(72) Inventors: Declan Tarrant, Killorglin (IE); David Patrick McCullough, Rancho Santa Margarita, CA (US); Jay Lickfett, San Diego, CA (US); Mayuri Sarupuri, Brea, CA (US); Suresh Kumar, Ladera Ranch, CA (US); Srinath Goud Medala, Tustin, CA (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

(21) Appl. No.: 16/876,975

(22) Filed: May 18, 2020

(65) Prior Publication Data

US 2020/0372448 A1    Nov. 26, 2020

Related U.S. Application Data

(60) Provisional application No. 62/850,452, filed on May 20, 2019.

(51) Int. Cl.
*G06Q 10/087* (2023.01)
*G06K 7/10* (2006.01)

(52) U.S. Cl.
CPC ....... *G06Q 10/087* (2013.01); *G06K 7/10366* (2013.01)

(58) Field of Classification Search
CPC .......................... G06Q 10/087; G06K 7/10366
USPC ....................................................... 705/28
See application file for complete search history.

(56) References Cited

U.S. PATENT DOCUMENTS

| 7,298,264 | B1 | 11/2007 | Kuzma et al. |
| 2007/0176750 | A1 | 8/2007 | Sakai et al. |
| 2008/0061935 | A1 | 3/2008 | Melendez et al. |
| 2008/0151817 | A1* | 6/2008 | Fitchett ................ H04W 28/20 370/329 |

(Continued)

FOREIGN PATENT DOCUMENTS

WO    WO2004100098    * 11/2004 ............. G08B 13/14

OTHER PUBLICATIONS

International Search Report and Written Opinion issued in International Patent Application No. PCT/US2020/033442 dated Jul. 6, 2020.

*Primary Examiner* — Jan P Mincarelli
(74) *Attorney, Agent, or Firm* — ArentFox Schiff LLP

(57) ABSTRACT

Aspects of the present disclosure include a method, an apparatus, and computer-readable medium for transmitting, via a RFID device, an allocation request for serial numbers to be associated with a product identifier, receiving a batch of serial numbers from a remote server, selecting a first serial number from the batch of serial numbers, wherein the first serial number is selected during a time period in which the RFID device lacks network connectivity with the remote server, transmitting the first serial number to a first RFID tag configured to be coupled with an article associated with the product identifier, and transmitting an update to the remote server indicating that the first serial number has been registered to the first RFID tag, in response to determining the RFID device is communicatively connected to the remote server.

12 Claims, 4 Drawing Sheets

(56) References Cited

U.S. PATENT DOCUMENTS

2016/0162773 A1* 6/2016 McAllister ............ B65C 11/006
                                                           340/10.51
2017/0053071 A1* 2/2017 Caputo .............. G06K 19/0776

* cited by examiner

RFID TAG COMMISSIONING FOR OFFLINE TAG WRITING

CROSS-REFERENCE TO RELATED APPLICATIONS

The present application claims priority to United States Provisional Patent Application No. 62/850,452, filed on May 20, 2019, entitled "RFID Tag Commissioning for Offline Tag Writing," hereby incorporated by reference.

BACKGROUND

The present disclosure relates generally to inventory management utilizing radio-frequency identification (RFID) technology.

Radio frequency identification (RFID) systems use electromagnetic field to identify and track individual RFID tags attached to objects as the tags pass in the vicinity of an RFID reader. The tags contain electronically stored information, and may be passive tags, active tags, or a combination of both. Passive tags collect energy from a nearby RFID reader's interrogating radio waves. Active tags have a local power source (such as a battery) and may operate hundreds of meters from the RFID reader. Unlike a barcode, the tag need not be within the line of sight of the reader, so the tag may be embedded in the tracked object.

In recent years, retailers (e.g., apparel retailers) have deployed a radio frequency identification system in stores to track product movements. For example as product arrives at stores, the product is placed on display on the sales floor, and are sold. By using RFID technology, retailers are able to reduce the amount of time that store employees spend counting the inventory of product (e.g., manually counting inventory that is on the floor and in stock room), as well as increase merchandise visibility within each store, thereby enabling shoppers in the store and online to find what they seek, at the location where they need it.

SUMMARY

Aspects of the present disclosure include a method including transmitting, via a RFID device, an allocation request for serial numbers to be associated with a product identifier, receiving a batch of serial numbers from a remote server, selecting a first serial number from the batch of serial numbers, wherein the first serial number is selected during a time period in which the RFID device lacks network connectivity with the remote server, transmitting the first serial number to a first RFID tag configured to be coupled with an article associated with the product identifier, and transmitting an update to the remote server indicating that the first serial number has been registered to the first RFID tag, in response to determining the RFID device is communicatively connected to the remote server.

In another aspect, an apparatus may include a memory configured to store instructions and a processor communicatively coupled with the memory, the processor configured to execute the instructions to transmit, via a RFID device, an allocation request for serial numbers to be associated with a product identifier, receive a batch of serial numbers from a remote server, select a first serial number from the batch of serial numbers, wherein the first serial number is selected during a time period in which the RFID device lacks network connectivity with the remote server, transmit the first serial number to a first RFID tag configured to be coupled with an article associated with the product identifier, and transmit an update to the remote server indicating that the first serial number has been registered to the first RFID tag, in response to determining the RFID device is communicatively connected to the remote server.

In some aspects, a non-transitory computer readable medium for inventory management utilizing radio-frequency identification (RFID) technology, may include code that, when executed by one or more processors of an apparatus, causes the one or more processors to transmit, via a RFID device, an allocation request for serial numbers to be associated with a product identifier, receive a batch of serial numbers from a remote server, select a first serial number from the batch of serial numbers, wherein the first serial number is selected during a time period in which the RFID device lacks network connectivity with the remote server, transmit the first serial number to a first RFID tag configured to be coupled with an article associated with the product identifier, and transmit an update to the remote server indicating that the first serial number has been registered to the first RFID tag, in response to determining the RFID device is communicatively connected to the remote server.

Aspects of the present disclosure include a method including receiving from an RFID device an allocation request for serial numbers to be associated with a product identifier, determining a batch of serial numbers that have not been registered to existing RFID tags associated with the product identifier and that further have not been allocated as a batch to another RFID device, transmitting the batch of serial numbers to the RFID device, and modifying a database of serial numbers to indicate a subset of the batch of serial numbers has been registered to RFID tags associated with the product identifier, in response to receiving a registration indication from the RFID device.

In another aspect, an apparatus may include a memory configured to store instructions and a processor communicatively coupled with the memory, the processor configured to execute the instructions to receive from an RFID device an allocation request for serial numbers to be associated with a product identifier, determine a batch of serial numbers that have not been registered to existing RFID tags associated with the product identifier and that further have not been allocated as a batch to another RFID device, transmit the batch of serial numbers to the RFID device, and modify a database of serial numbers to indicate a subset of the batch of serial numbers has been registered to RFID tags associated with the product identifier, in response to receiving a registration indication from the RFID device.

In some aspects, a non-transitory computer readable medium for inventory management utilizing radio-frequency identification (RFID) technology, may include code that, when executed by one or more processors of an apparatus, causes the one or more processors to receive from an RFID device an allocation request for serial numbers to be associated with a product identifier, determine a batch of serial numbers that have not been registered to existing RFID tags associated with the product identifier and that further have not been allocated as a batch to another RFID device, transmit the batch of serial numbers to the RFID device, and modify a database of serial numbers to indicate a subset of the batch of serial numbers has been registered to RFID tags associated with the product identifier, in response to receiving a registration indication from the RFID device.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
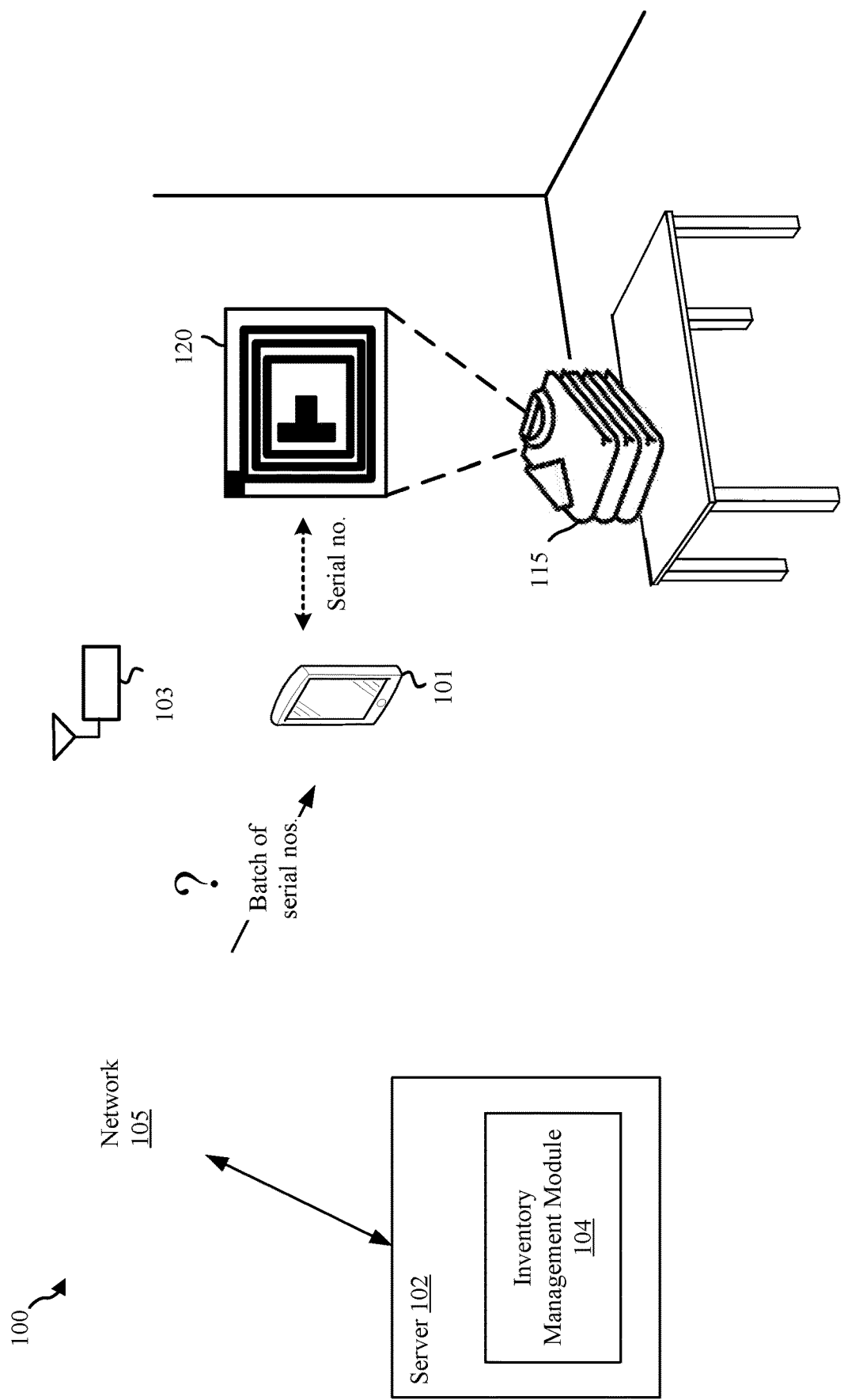
FIG. 1 is a diagram illustrating an example of a system for inventory management using RFID devices in accordance with aspects of the present disclosure.

Various aspects are now described in more detail with reference to the FIGS. 1-3. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

When using RFID systems, there are occasions in which retailers may need to write new RFID tags to be coupled with products. For example, shelved or returned products may have missing or damaged RFID tags, or merchandise may arrive at the retailer's store without RFID tags. In these cases, a staff member may attach a new RFID tag to an item or product and program that RFID with the correct information needed for inventory management, e.g., electronic product code or serial number.

RFID tag commissioning needs to be managed at a central server to make sure that serial numbers are unique for each item for a given product and a given company (e.g., retail company). This mandates a network connection to the central server from a remote location when RFID tags are being written. The present disclosure addresses the problem of known radio-frequency identification systems wherein this network connection to a remote server needs to be maintained for continuous RFID tag writing (e.g., by a handheld RFID reader) to be performed at a store. Stores often have intermittent and unreliable internet connectivity. For example, an individual store may be contained within a larger multi-level building complex (e.g., mall) in which outside wireless signals are difficult to obtain. In another example, warehouses or backrooms of store buildings may have metal structural elements that interfere with wireless connectivity of a RFID device. The present disclosure provides the following methodology to allow RFID tags to be written at a remote location where there is no connection to the central server or when the connection is unreliable or costly. Additionally, the use of a central server for RFID tag commissioning also leads to the problem of a system bottleneck at the server. If the server is frequently pinged for serial numbers by RFID readers, obtaining access to the server can be difficult. The present disclosure provides techniques to allow serial numbers to be registered for RFID tags in a manner that reduces the demand and resource load on the server.

According to an aspect, when a remote device (e.g., RFID reader) connects to the central server and requests serial numbers for a specific product and for a specific company, the central system generates a batch of serial numbers instead of just one. The serial numbers can be a single contiguous set of numbers or a set of contiguous numbers.

The remote device "consumes" the batch of serial numbers given to it, without needing to talk to the central server for each tag write. That is, when the remote device needs a serial number (for writing a RFID tag), the remote device can take a serial number from the locally-stored batch of serial numbers instead of requesting for one from the server at each instance. The serial numbers that are consumed are tracked when the tags that are written are registered with the central server.

When the number of unused serial numbers at the remote device for a specific product reaches a low watermark, the remote device connects to the central server and requests a new batch of serial numbers. The remote device can request serial numbers for a list of products in the same call to the server. For a list of products, a separate batch of serial numbers is returned for each product in the same response.

The batch size for serial numbers can be adjusted depending on the length of time the remote device needs to write tags without talking to the server.

When the central server runs out of serial number batches for a given product/company, it will look for unused blocks of serial numbers from previous batches based on the time elapsed since that batch was assigned to a remote device. This time can be adjusted per company that is a data tenant of the inventory management system. In this scenario, the serial numbers returned may be a list of serial number ranges instead of a single contiguous list of numbers.

FIG. 1 is a diagram illustrating an inventory management system 100 in accordance with aspects of the present disclosure. The system 100 includes a RFID device 101 that can be communicatively connected with a remote server 102, for example, via a network 105. The remote server 102 includes an inventory management module 104 configured to manage a database of serial numbers and their corresponding products and companies.

As discussed above, retailers (e.g., apparel retailers) have deployed a radio frequency identification (RFID) system in stores to track product movements as they arrive at stores, are placed on display on the sales floor, and are sold. By adopting RFID technology, retailers are able to reduce the amount of time that the store employees spend counting the inventory (e.g., manually counting inventor that is on the floor and in stock room), as well as increase merchandise visibility within each store, thereby enabling shoppers in the store and online to find what they seek, at the location where they need the product. RFID use radio waves to read and capture information stored on a tag attached to an object (e.g., product 115). A tag (e.g., EPC tag 120) can be read from up to several feet away and does not need to be within direct line-of-sight of the reader to be tracked. Thus, an RFID system may be made up of two parts: a tag or label (e.g., EPC tag 120) and an RFID device (e.g., fixed RFID reader 103 or a handheld RFID reader 101). RFID tags or labels 120 are embedded with a transmitter and a receiver. The RFID component on the tags may include a microchip that stores and processes information, and an antenna to receive and transmit a signal. The EPC tag 120 may further contain the specific serial number for each specific object.

To read the information encoded on an EPC tag 120, a two-way radio transmitter-receiver called an interrogator or reader (e.g., RFID reader 101) emits a signal to the EPC tag 120 using the antenna of the RFID reader. The EPC tag 120 may respond with the information (e.g., serial number) written in the memory bank. For purposes of this disclosure, the terms, the EPC tag and RFID tag may be used interchangeably. The EPC tag 120 may be a passive tag or a battery powered EPC tag. A passive RFID tag may use the RFID interrogator or receiver's radio wave energy to relay the stored information back to the interrogator. In contrast, a battery powered EPC tag may be embedded with a small battery that powers the relay of information.

In a retail setting, EPC tags 120 may be attached to or coupled with articles of clothing, merchandise, or other products 115. When a staff member or retail employee uses a handheld RFID reader 101 to scan a pile or a stack of products (e.g., jeans or shirts), the staff member is able to differentiate between two pairs of identical jeans based upon the information stored on the respective RFID tags without the need to individually scan each article of clothing because each pair will have its own serial number and the RFID receiver may be able to read multiple EPC tags 120 on the floor of different merchandise in one instance. As such, with one pass of a handheld RFID reader, the associate can not only find a specific pair, but the RFID reader may also output inventory count of how many of each pair are on the shelf and which pairs need to be replenished. The employee can learn all of this information without having to scan each individually.

According to aspects of the present disclosure, in addition to performing read operations on RFID tags, the RFID device 101 may be configured to write serial numbers and other data to blank RFID tags (which stores such data within an internal memory). The RFID device 101 communicates with the inventory management module 104 which manages the serial numbers and their corresponding products and companies such that each serial number is uniquely allocated to an individual item.

To write new RFID tags, the RFID reader 101 connects, via network 105, to the central server 102 and requests a batch or range of serial numbers for a specific product and companies. The inventory management module 104 allocates a batch of serial numbers (instead of allocating just a single serial number) and provides that batch to the RFID device 101. In some cases, the RFID reader 101 may use a wired network connection (e.g., via a docking station) to establish reliable network connectivity to ensure receipt of at least an initial batch of serial numbers from the server 102.

The RFID device 101 may be operated to scan new RFID tags, and in doing so, writes out serial numbers selected from the batch of serial numbers, without needing to interact with the central server for each tag write. The RFID device 101 keeps track of which serial numbers have been written out to which RFID tags, and registers the used serial numbers with the server 102 when network connectivity is obtained. When the number of unused serial numbers at the RFID device 101 for a specific product reaches a low threshold, the RFID device 101 communicatively couples with the server 102 and request a new batch of serial numbers. On the server-side, when the server 102 runs out of serial number batches for a given product/company, the remote server will look for unused blocks of serial numbers from previous batches based on the time elapsed since that batch was assigned to a remote device. This time can be adjusted per company/corporate customer. In this scenario, the serial numbers returned may be a list of serial number ranges instead of a single contiguous list of numbers.

Figure 2:
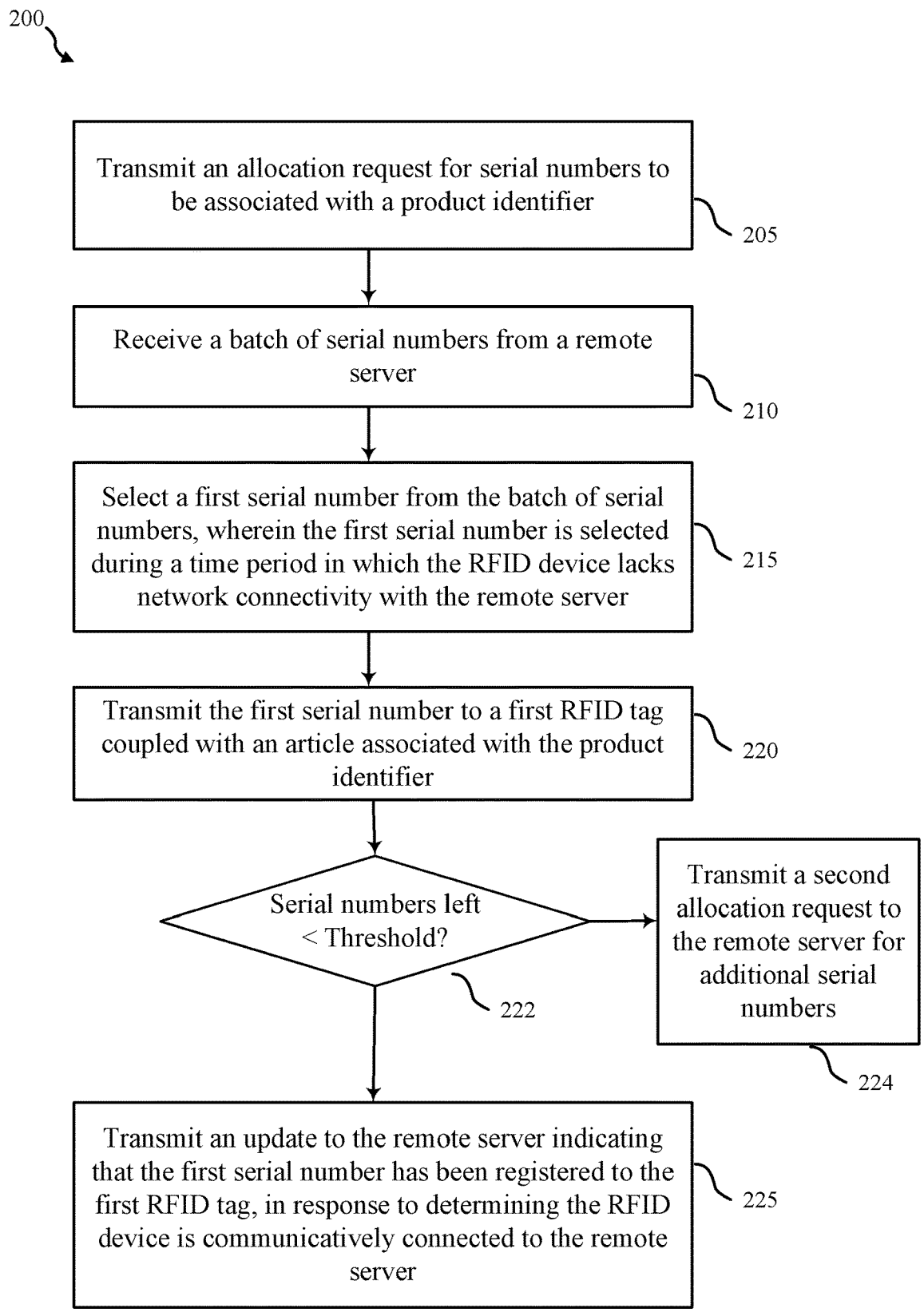
FIG. 2 is an example flowchart for performing inventory management utilizing radio-frequency identification (RFID) technology in accordance with aspects of the present disclosure.

FIG. 2 is flowchart 200 for inventory management utilizing radio-frequency identification (RFID) technology in accordance with aspects of the present disclosure. Aspects of flowchart 200 may be performed by the RFID reader 101 as described with reference to FIG. 1 and/or by a computer device 300 in communication with the RFID reader as described with reference to FIG. 3.

At block 205, the method 200 may include transmitting an allocation request for serial numbers to be associated with a product identifier. For example, the RFID device 101 can request serial numbers for a list of products in the same call to the server. For a list of products, a separate batch of serial numbers is returned for each product in the same response. Aspects of block 205 may be performed by communications component 315 via one or more antennas of the RFID reader 101.

In some aspects, the allocation request may indicate a batch size (e.g., a count of available serial numbers allocated in the resulting batch) that is determined by the RFID reader based on network connection quality between the RFID device and the remote server. In some aspects the allocation request indicates a batch size that is determined based on a length of time between communications between the RFID device and the remote server. For example, the batch size for serial numbers can be adjusted depending on the length of time the remote device may need to write tags without communicating with the server 102. In some aspects, the length of time may be predicted based on a log history of prior RFID-writing activities, or explicitly specified (e.g., via user input). In other aspects, the requested batch size itself can be explicitly specified by user input. According to some aspects, the batch size can be dynamically determined by the remote server 102 according to the above-described factors.

At block 210, the method 200 may include receiving a batch of serial numbers from a remote server. In some aspects, the batch of serial numbers comprises a list of one or more serial number ranges. In some aspects, a batch of serial numbers can be specified as one or more integer ranges (e.g., "000000001-000000010"), sets of individual integer serial numbers (e.g., "{000000001, 000000002, 000000005, 000000008}"), or a combination of both. Aspects of block 210 may be performed by communications component 315 via one or more antennas of the RFID reader 101.

At block 215, the method 200 may include selecting a first serial number from the batch of serial numbers. At block 220, the method 200 may include transmitting the first serial number to a first RFID tag configured to be coupled with an article associated with the product identifier. Aspects of block 215 and 220 may be performed by the processor 305 and communications component 315 via one or more antennas of the RFID reader 101. It is understood that the first serial number can be selected and transmitted during a time period in which the RFID device lacks network connectivity with the remote server. In a next iteration, a second serial number can be selected from the batch and transmitted to the RFID tag without communicating with the server 102 again. In this way, aspects of the present disclosure solve the problems of known approach by removing the requirement of constant network connectivity with the remote server during RFID tag writing operations.

In some aspects, at block 222, the RFID device 101 may determine that the count of unselected serial numbers in the batch is less a threshold amount (e.g., less than 5 remaining serial numbers). If so, at block 224, the method includes transmitting a second allocation request to the remote server for additional serial numbers. In some aspects, the RFID device 101 may determine that a current batch of serial numbers has gone "stale" (i.e., based on expiry of a time duration associated with the batch of serial numbers), discard the batch, and request a second batch of serial numbers from the remote server. Aspects of block 222 may be performed by the processor 305 of the RFID reader 101. Aspects of block 224 may be performed by communications component 315 via one or more antennas of the RFID reader 101.

At block 225, the method 200 may include transmitting an update to the remote server indicating that the first serial number has been registered to the first RFID tag, in response to determining the RFID device is communicatively connected to the remote server. Aspects of block 225 may also be performed by the communications component 315 and the inventory management system 330 described with reference to FIG. 3.

Figure 3:
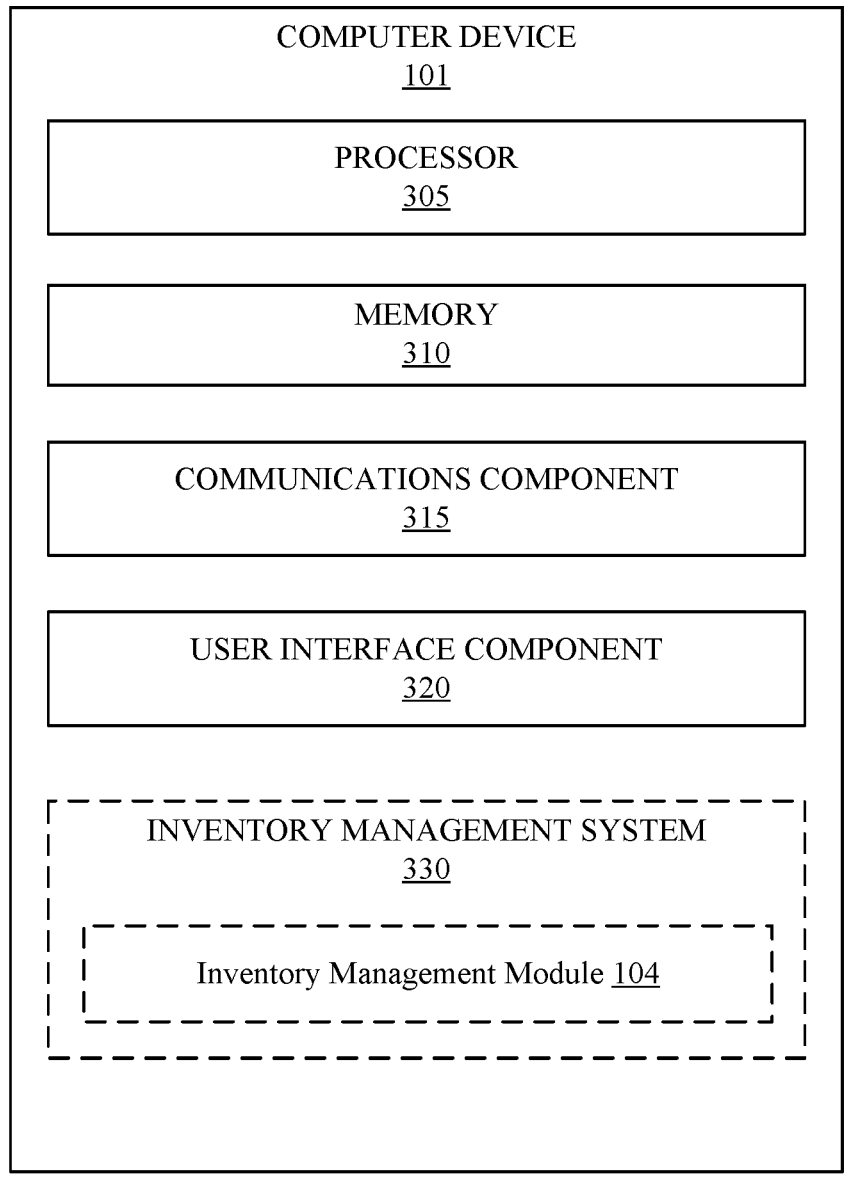
FIG. 3 is diagram illustrating an example of a hardware implementation for an RFID device in accordance with various aspects of the present disclosure.

Referring now to FIG. 3, a diagram illustrating an example of a hardware implementation for the computer device 300 in accordance with various aspects of the present disclosure is described. In some examples, the computer device 300 may be an example of the fixed RFID reader, handheld RFID reader, or a backend computer device such as a standalone computer or a server 102 in communication with one or more RFID readers that capture signals from one or more EPC tags with reference to FIG. 1.

The computer device 300 may include a processor 305 for carrying out one or more processing functions (e.g., method 200) described herein. The processor 305 may include a single or multiple set of processors or multi-core processors. Moreover, the processor 305 can be implemented as an integrated processing system and/or a distributed processing system.

The computer device 300 may further include a memory 310, such as for storing local versions of applications being executed by the processor 305. In some aspects, the memory 310 may be implemented as a single memory or partitioned memory. In some examples, the operations of the memory 310 may be managed by the processor 305. Memory 310 can include a type of memory usable by a computer, such as random access memory (RAM), read only memory (ROM), tapes, magnetic discs, optical discs, volatile memory, non-volatile memory, and any combination thereof. Additionally, the processor 305, and memory 310, may include and execute operating system (not shown).

Further, the computer device 300 may include a communications component 515 that provides for establishing and maintaining communications with one or more parties utilizing hardware, software, and services as described herein. Communications component 315 may carry communications between components and modules of the computer device 300. The communications component 315 may also facilitate communications with external devices to the computer device 300, such as to electronic devices coupled locally to the computer device 300, and/or located across a communications network and/or devices serially or locally connected to the computer device 200. For example, communications component 315 may include one or more buses operable for interfacing with external devices.

The computer device 300 may include a user interface component 420 operable to receive inputs from a user of the computer device 300 and further operable to generate outputs for presentation to the user. The user interface component 320 may include one or more input devices, including but not limited to a navigation key, a function key, a microphone, a voice recognition component, any other mechanism capable of receiving an input from a user, or any combination thereof. For example, the user interface component 320 may include a trigger to initiate a RFID scan for inventory management. Further, user interface component 320 may include one or more output devices, including but not limited to a display, a speaker, any other mechanism capable of presenting an output to a user, or any combination thereof.

The computer device 300 may optionally include an inventory management system 330 to perform one or more techniques discussed in this application, including requesting an allocated batch of serial numbers and writing these serial numbers to new RFID tags. For example, the computer device 300 may include the inventory management system 330 when the computer device 300 is implemented as a server, such as the server 102 in FIG. 1. The inventory management system 330 may optionally include the inventory management module 104 in the server 102 shown in FIG. 1. In one aspect, the processor 305 and/or the inventory management system 330 may execute instructions to implement the inventory management module 104.

Figure 4:
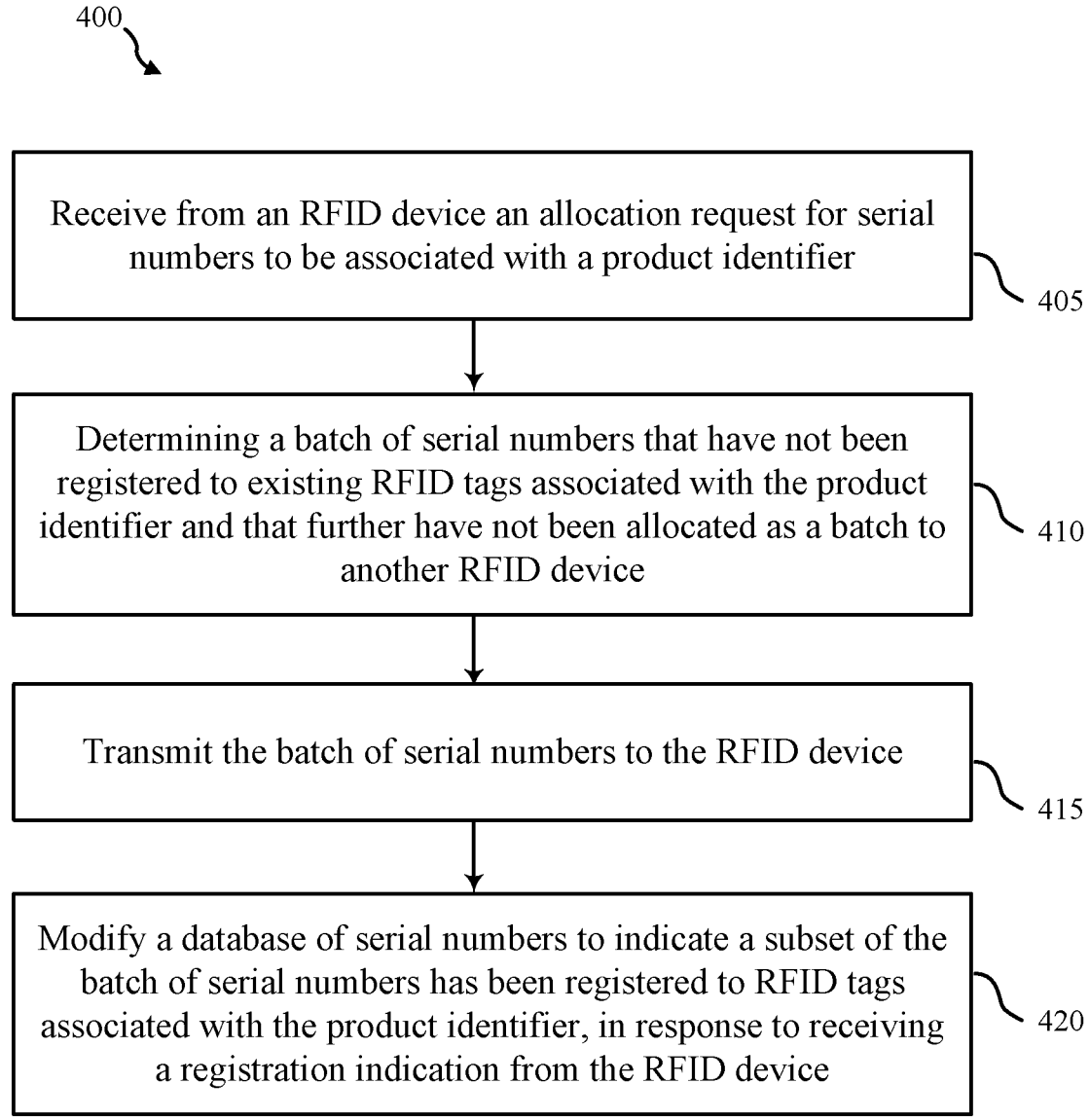
FIG. 4 is an example flowchart for inventory management utilizing RFID technology system in accordance with aspects of the present disclosure.

FIG. 4 is flowchart 400 for inventory management utilizing radio-frequency identification (RFID) technology in accordance with aspects of the present disclosure. Aspects of flowchart 400 may be performed by the server 102 as described with reference to FIG. 1. An example of the server 102 as described in FIG. 1 may be implemented using the computer device 300 described in FIG. 3.

At block 405, the method 400 may include receiving from an RFID device an allocation request for serial numbers to be associated with a product identifier. Aspects of block 405 may be performed by communications component 315 of via one or more antennas of the RFID reader 101.

At block 410, the method 400 may include determining a batch of serial numbers that have not been registered to existing RFID tags associated with the product identifier and that further have not been allocated as a batch to another RFID device. In one example, the inventory management system 330 may keep track of a "current" or "next" serial number to be allocated for each particular product identifier using a counter. When an allocation request is received, the inventory management system may increment the serial number counter by the batch size. For example, the inventory management system 330 may maintain a counter that indicates the next available serial number is "000000100." When an RFID device requests a batch of serial numbers, the inventory management system 100 increments the counter to "000000150" after allocating a batch of 50 serial numbers.

In one aspects, the method 400 may include determining a size of the batch of serial numbers. In some aspects, the size of the batch of serial numbers may be determined based on network connection quality between the RFID device and the remote server. In another aspect, the size of the batch of serial numbers may be determined based on a length of time between communications between the RFID device and the remote server. Aspects of block 410 may be performed by the processor 315 and/or the inventory management system 330 described with reference to FIG. 3.

At block 415, the method 400 may include transmitting the batch of serial numbers to the RFID device. In some aspects, the transmitted batch of serial numbers may include a list of one or more serial number ranges. Aspects of block 415 may be performed by communications component 315 described with reference to FIG. 3.

At block 420, the method 400 may include modifying a database of serial numbers to indicate a subset of the batch of serial numbers has been registered to RFID tags associated with the product identifier, in response to receiving a registration indication from the RFID device. Aspects of block 420 may be performed by the processor 305 and/or the inventory management 330 described with reference to FIG. 3.

In some aspects, the method 400 may further include determining a second batch of serial numbers from prior-allocated serial numbers according to an expiry of a time duration associated with the prior-allocated serial numbers, responsive to determining a maximum number of serial numbers associated with the product identifier have been allocated. For example, the inventory management system 330 may determine that the counter value has reached a maximum count value of "999999999", after which the inventory management system attempts to "reclaim" previously allocated serial numbers (e.g., starting from serial number 000000001) whose potential registration has lapsed.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a device, which can be a wired device or a wireless device. A wireless device may be a handheld RFID reader, a mobile device, cellular telephone, a satellite phone, a cordless telephone, a Session Initiation Protocol (SIP) phone, a wireless local loop (WLL) station, a personal digital assistant (PDA), a handheld device having wireless connection capability, a computer device, or other processing devices connected to a wireless modem.

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It should be appreciated to those of ordinary skill that various aspects or features are presented in terms of systems that may include a number of devices, components, modules, and the like. It is to be understood and appreciated that the various systems may include additional devices, components, modules, etc. and/or may not include all of the devices, components, modules etc. discussed in connection with the figures.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD- ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave may be included in the definition of medium. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for inventory management utilizing radio-frequency identification (RFID) technology, comprising:
    transmitting, via a RFID device, an allocation request for serial numbers to be associated with a product identifier;
    receiving a batch of serial numbers from a remote server, with the remote server dynamically determining a size of the batch of serial numbers based on network connection quality between the RFID device and the remote server and the allocation request;
    selecting a first serial number from the batch of serial numbers, wherein the first serial number is selected during a time period in which the RFID device lacks network connectivity with the remote server;
    transmitting the first serial number to a first RFID tag configured to be coupled with an article associated with the product identifier; and
    transmitting an update to the remote server indicating that the first serial number has been registered to the first RFID tag, in response to determining the RFID device is communicatively connected to the remote server.

2. The method of claim 1, further comprising:
    transmitting a second allocation request for additional serial numbers, responsive to determining a count of unselected serial numbers in the batch is less than a threshold amount.

3. The method of claim 1, wherein the allocation request indicates a batch size that is determined based on a length of time between communications between the RFID device and the remote server.

4. The method of claim 1, further comprising:
    discarding the batch of serial numbers and requesting a second batch of serial numbers from the remote server, responsive to determining that an expiry of a time duration associated with the batch of serial numbers.

5. The method of claim 1, wherein the batch of serial numbers comprises a list of one or more serial number ranges.

6. An apparatus for inventory management utilizing radio-frequency identification (RFID) technology, comprising:
    a memory configured to store instructions; and
    a processor communicatively coupled with the memory, the processor configured to execute the instructions to:
        transmit an allocation request for serial numbers to be associated with a product identifier;
        receive a batch of serial numbers from a remote server, with the remote server dynamically determining a size of the batch of serial numbers based on network connection quality between the apparatus and the remote server and the allocation request;
        select a first serial number from the batch of serial numbers, wherein the first serial number is selected during a time period in which the apparatus lacks network connectivity with the remote server;
        transmit the first serial number to a first RFID tag configured to be coupled with an article associated with the product identifier; and
        transmit an update to the remote server indicating that the first serial number has been registered to the first RFID tag, in response to determining the apparatus is communicatively connected to the remote server.

7. The apparatus of claim 6, wherein the processor is further configured to execute the instructions to:
    transmit a second allocation request for additional serial numbers, responsive to determining a count of unselected serial numbers in the batch is less than a threshold amount.

8. The apparatus of claim 6, wherein the allocation request indicates a batch size that is determined based on a length of time between communications between the apparatus and the remote server.

9. The apparatus of claim 6, wherein the processor is further configured to execute the instructions to:

discard the batch of serial numbers and requesting a second batch of serial numbers from the remote server, responsive to determining that an expiry of a time duration associated with the batch of serial numbers.

10. The apparatus of claim 6, wherein the batch of serial numbers comprises a list of one or more serial number ranges.

11. A non-transitory computer readable medium for inventory management utilizing radio-frequency identification (RFID) technology, comprising code that, when executed by one or more processors of an apparatus, causes the one or more processors to:

transmit an allocation request for serial numbers to be associated with a product identifier;

receive a batch of serial numbers from a remote server, with the remote server dynamically determining a size of the batch of serial numbers based on network connection quality between the apparatus and the remote server and the allocation request;

select a first serial number from the batch of serial numbers, wherein the first serial number is selected during a time period in which the apparatus lacks network connectivity with the remote server;

transmit the first serial number to a first RFID tag configured to be coupled with an article associated with the product identifier; and transmit an update to the remote server indicating that the first serial number has been registered to the first RFID tag, in response to determining the apparatus is communicatively connected to the remote server.

12. The method of claim 1, wherein the allocation request includes a list of products and the received batch of serial numbers includes a separate batch of serial numbers for each product.

\* \* \* \* \*